Jan. 27, 1931.    M. A. J. FAVE    1,790,413
DYNAMO ELECTRIC MACHINE
Filed Feb. 1, 1927
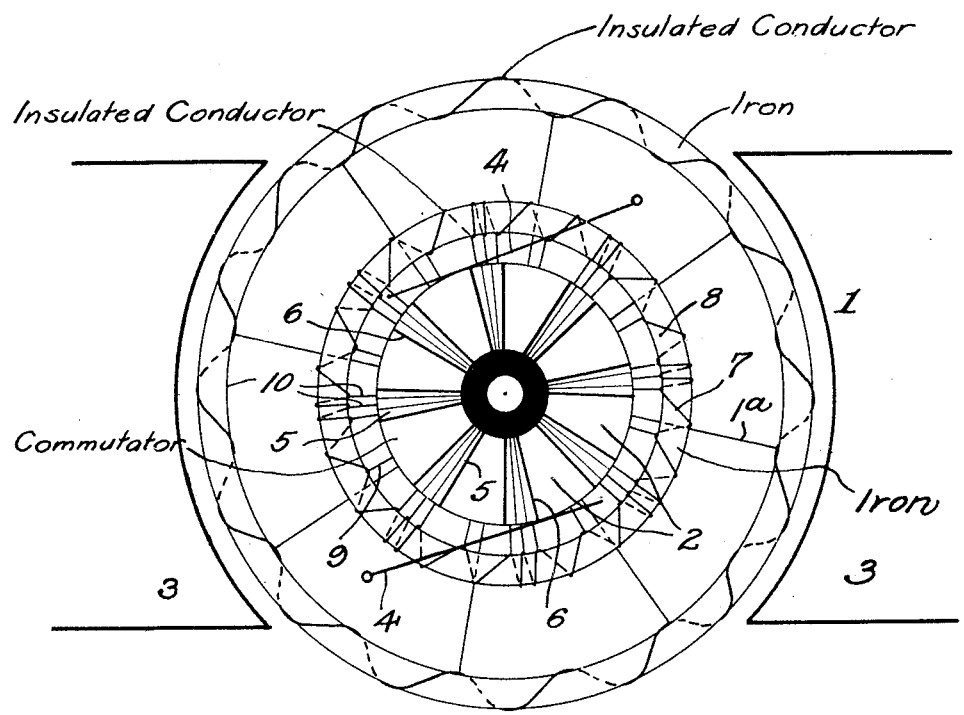
INVENTOR.
M.A.J.Fave
BY Marks & Clerk
ATTORNEYS.

Patented Jan. 27, 1931

1,790,413

UNITED STATES PATENT OFFICE

MARIE ALEXANDRE JEAN FAVE, OF BORDEAUX, FRANCE

DYNAMO-ELECTRIC MACHINE

Application filed February 1, 1927, Serial No. 165,182, and in France February 1, 1926.

The object of the present invention is the construction of dynamos having a high electromotive force induced in each section of the armature winding.

The difference of potential between two successive commutator segments must not exceed a certain value (about thirty volts) to avoid arcing at the commutator surface.

This usually does not allow the construction of dynamos in which the electromotive force induced per section would be greater than the limiting value.

It is well known that arcing between two points is necessarily accompanied by a dissymmetry in the distribution of the electric potentials.

The invention has for object to render uniform the distribution of potential into the insulating material separating two successive segments of the commutator. I beg to point out that the object of the invention is not to improve the switching, as proposed by many inventors, but only to avoid or prevent arcing between two successive segments of the commutator, when the E. M. F. induced in the section of the armature winding corresponding to these two segments is a maximum, that is to say when this section reaches a position contiguous to a polar piece of the inductor, and not when the said segments pass under the brushes.

For that purpose, the invention consists in inserting in the insulating material separating the main segments, conducting blades much thinner than the said segments, these blades not being adapted to cooperate with the brushes for collecting the current of the dynamo, and in connecting the said blades, as well as the segments, by equidistant connections with a closed winding the core of which is constituted by a laminated magnetic ring independent of the armature.

The attached drawing represents, as an example only, a form of construction of the invention.

In the illustrated example, the armature of the dynamo is indicated by the reference numeral 1. The winding of this armature is divided into several sections, in the known manner, by conductor wires 1a which connect equidistant points of the said armature winding to the segments 2 of the commutator. The inductors of the dynamo are shown at 3, and the brushes at 4.

According to the invention, thin conducting blades 5 are arranged within the insulating material 6 which separates the segments 2 of the commutator; the blades 5 are regularly spaced apart, the insulation being of the same thickness between the thin blades, as between the commutator segments and the nearest thin blades.

A closed winding 7 is disposed on a laminated magnetic core 8 juxtaposed to the commutator and partaking in its rotation, the said winding 7 being of annular shape, and constituted by a conducting wire of small diameter.

The winding 7 is divided into sections by equidistant connections 9 corresponding in number to the commutator segments 2 and connected to the latter.

On each of the sections of the ring winding, supplementary tappings 10 are provided which are regularly spaced apart, and equal in number to the thin blades 5 to which the said tappings are connected.

The laminated magnetic core, its ring winding and its connections to the various commutator segments and thin blades constitutes an auto-transformer for potential distribution, which has for effect to divide the potential difference between two successive commutator segments into several fractions of the same value owing to the presence of the thin blades, the value of each potential fraction not being sufficiently great to start and maintain a superficial electric arc, even when the E. M. F. induced in any section of the armature winding is a maximum.

What I claim as my invention and desire to secure by Letters Patent is:—

In a dynamo electric machine, the combination of an armature, having a winding, a commutator comprising segments, leads connecting the said segments to certain points of the armature winding, insulating material separating the segments, thin conducting blades inserted in the said insulating material in such a manner that the insulation is of same thickness between the blades and between the segments and the nearest blades, a laminated core juxtaposed to the commutator, a winding independent of the armature, arranged on the laminated magnetic core, and leads for connecting equidistant points of the said winding to the commutator segments and to the thin blade.

In testimony whereof I have signed my name to this specification.

MARIE ALEXANDRE JEAN FAVE.